Figure 1:
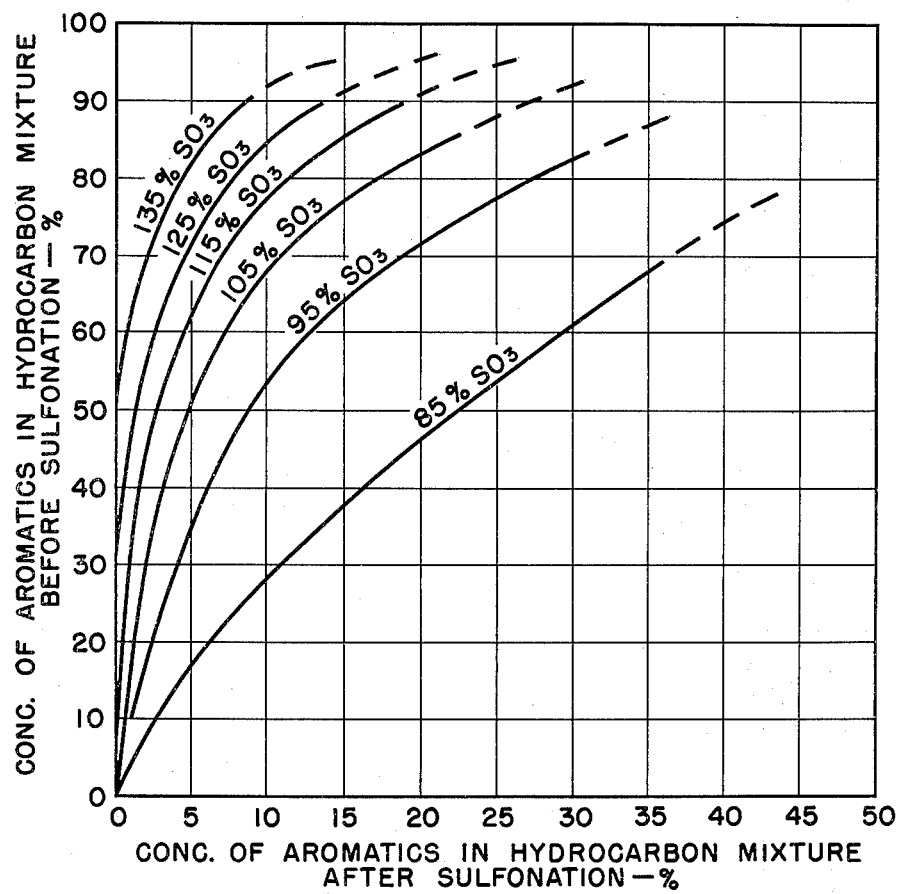

INVENTORS.
JOHN W. CONWELL
HORACE E. LUNTZ
DANIEL O. POPOVAC
BY
Floyd Trimble
ATTORNEY United States Patent Office 3,007,961
Patented Nov. 7, 1961

3,007,961
PREPARATION OF ALKARYL SULFONATES
John W. Conwell, Horace E. Luntz, and Daniel O. Popovac, Ponca City, Okla., assignors to Continental Oil Company, Ponca City, Okla., a corporation of Delaware
Filed Oct. 28, 1955, Ser. No. 543,512
13 Claims. (Cl. 260—505)

This invention relates to an improved process for the preparation of alkaryl sulfonates of high purity which have improved surface active characteristics of detergency, wetting, demulsification, penetration, and like phenomena. More particularly this invention relates to a process whereby a sulfonatable hydrocarbon diluted with aliphatic and other unsulfonatable hydrocarbons (hereinafter identified collectively as unsulfonatable hydrocarbons) may be completely sulfonated and the unsulfonatable hydrocarbons recovered from the sulfonated product.

Several methods have been suggested in the prior art for the production of improved alkaryl sulfonates which in general have involved the purification of the crude aromatic alkylation product prior to sulfonation. Although products of high purity can be prepared by these methods, none have been entirely satisfactory because quality and the yield of the product vary inversely. In one of the proposed methods the aromatic alkylation product was treated with small quantities of sulfuric acids or other acidic material to effect a purification prior to sulfonation. In another method a naphtha fraction was subject to solvent extraction to remove condensed ring aromatic hydrocarbons and also sulfur and nitrogen containing compounds. It has been proposed also to remove undesirable components of an aromatic alkylation product by fractional distillation, solvent extraction, or by treatment with absorbents such as silica gel, charcoal, etc.

Specifically if dodecylbenzene or a similar alkaryl hydrocarbon obtained by the alkylation of an aromatic hydrocarbon with an olefinic hydrocarbon is purified by distillation there are obtained certain hydrocarbon fractions boiling over a temperature range other than the temperature range of the desired alkaryl hydrocarbon. These hydrocarbon fractions contain alkaryl hydrocarbons and unsulfonatable hydrocarbons which cannot be separated by conventional distillation techniques. Sulfonation of such a mixture with a sulfonating agent, as for example sulfur trioxide, yields an alkaryl hydrocarbon sulfonic acid containing a rather high percent of inorganic acid. Furthermore, if sufficient sulfonating agent is used to sulfonate the sulfonatable material completely, the resulting sulfonic acid will be objectionable because of inorganic acid formation and color characteristics. If, on the other hand, the mixture of sulfonatable and unsulfonatable products are treated with a limited amount of sulfonating agent the resulting product will be satisfactory in respect to color and inorganic acid but the sulfonation yield will be low. Thus, for example, if a mixture of 50% aromatic hydrocarbons and 50% unsulfonatable hydrocarbons is treated with 100% of the theoretical amount of sulfur trioxide based on aromatic content, the resulting aromatic hydrocarbon sulfonic acid will have a low inorganic acid content and the aliphatic hydrocarbon will contain about 7% aromatic hydrocarbons. If this same mixture is treated with 135% of the theoretical amount of sulfur trioxide necessary for complete sulfonation, the aromatic hydrocarbon sulfonic acid so produced will be dark colored and will contain about 10% of an inorganic acid. The unsulfonatable hydrocarbon recovered from this mixture after sulfonation will be free of aromatic hydrocarbons.

It is, therefore, a principal object of the present invention to provide a process which obviates the disadvantages of the prior art processes. It is another object of our invention to provide a process whereby a mixture of sulfonatable and unsulfonatable hydrocarbons may be sulfonated to obtain an aromatic sulfonic acid of good color and having a low inorganic acid content. It is another object of the present invention to provide a process by which unsulfonatable hydrocarbons can be recovered from such mixtures substantially free of sulfonatable hydrocarbons. Yet another object of our invention is to provide a sulfonation process using smaller quantities of the sulfonating agent than the prior art processes. These and other objects and advantages of the invention will become apparent as the invention is hereinafter more thoroughly discussed.

In brief, the invention may be described as a process for the sulfonation in several stages of sulfonatable hydrocarbons diluted with unsulfonatable hydrocarbons comprising the treatment of the diluted sulfonatable hydrocarbons with an amount of sulfonating agent under conditions such that the sulfonatable hydrocarbon contained in the mixture is incompletely sulfonated in the first stage. The resulting mixture is then allowed to separate into two layers, a lower layer comprising sulfonated hydrocarbons and an upper layer comprising the unsulfonatable hydrocarbons diluted with that portion of the sulfonatable hydrocarbons that were not sulfonated in the first stage. The upper layer is then removed and treated a second time with an additional quantity of the sulfonating agent under conditions that the sulfonatable hydrocarbons contained therein will be completely sulfonated. Obviously, if desired, the sulfonation procedure can be conducted in more than two stages in which case the mixture in the second stage will be treated under conditions that only a portion of the sulfonatable hydrocarbons contained therein will be sulfonated. The unsulfonatable hydrocarbons, after the complete sulfonation of the sulfonatable hydrocarbons, may then be recovered from the mixture in a pure state.

Any of the sulfonating agents listed in the prior art are suitable for use in our invention; such as sulfuric acid, chlorosulfonic acid, oleum, sulfur trioxide, etc. In general, however, we prefer sulfur trioxide or oleum. When sulfur trioxide is used as the sulfonating agent it may be used as such or as a stabilized liquid sulfur trioxide available commercially under the trade name "Sulfan" which contains more than 99 percent available $SO_3$ content or a similar stabilized sulfur trioxide may be used if desired. For best results we prefer to dilute the sulfur trioxide with a gas which does not react with the other components such as dry air, nitrogen, carbon dioxide, sulfur dioxide, a lower alkane, etc. When dry air is used as the diluent the preferred weight ratio of air to sulfur trioxide may vary from about 9:1 to 1:1. It is to be understood, however, that higher or lower ratios may be used as, for example, 1 percent sulfur trioxide in the mixture will effect sulfonation and at the other extreme concentration of up to 100 percent sulfur trioxide in the mixture may be used. When low concentrations of $SO_3$ are used the reaction becomes slow and at high concentrations adequate heat dissipation becomes difficult because of the rapid reaction rate. Apparently the preferred concentration of sulfur trioxide in the mixture is independent of the particular diluent used.

In accordance with the present invention a mixture of sulfonatable and unsulfonatable hydrocarbons is sulfonated with sulfur trioxide in a multi-stage operation using a quantity of sulfur trioxide in each stage directly related to the concentration of sulfonatable hydrocarbons present in the hydrocarbon mixture entering each stage whereby a sulfonic acid of improved color and an unsulfonatable hydrocarbon of essentially no sulfonatable hydrocarbon content are obtained. Sulfur trioxide is thus utilized more efficiently than for a single stage sulfonation. To obtain the foregoing benefits, sulfonation of the hydrocarbon mixture is best carried out using a definite amount of sulfur trioxide as determined by the following equation:

$$E = 112 - 0.22C \pm 5$$

where $E$ = mole percent of sulfur trioxide based on the sulfonatable hydrocarbon content in the mixture, and
$C$ = mole percent of sulfonatable hydrocarbons in the hydrocarbon mixture being sulfonated.

From this equation it is seen that the higher the concentration of the sulfonatable hydrocarbons in the hydrocarbon mixture being sulfonated, the lower the amount of sulfur trioxide that should be used. When, however, the concentration of sulfonatable hydrocarbons in the hydrocarbon mixture being sulfonated is high, the sulfonation is not complete and the unsulfonatable hydrocarbons will contain a certain amount of sulfonatable hydrocarbons. This is illustrated graphically in FIGURE 1 wherein the relationship of the concentration of sulfonatable hydrocarbons in the hydrocarbons being sulfonated to the concentration of sulfonatable hydrocarbons in the unsulfonatable hydrocarbons remaining after sulfonation for various amounts of sulfur trioxide is given. Generally, two stages are sufficient to reduce the concentration of aromatic hydrocarbon in the aliphatic hydrocarbons remaining after sulfonation to zero.

As is well known, the heat of sulfonation of a sulfonatable compound using sulfur trioxide as the sulfonating agent is high based on the amount of the aromatic compounds sulfonated. Consequently, special means must be provided for heat removal. A reaction vessel or sulfonator suitably designed to contain the liquid reactants and products meeting this requirement is of an elongated form and in addition it allows adequate space of travel for the reaction mixture to obtain the desired amount of reaction therein before the mixture reaches the end of the reaction zone. Such a reaction vessel as just described and which is well suited to the sulfonation process according to the present invention after certain modifications as will be hereinafter pointed out, is commercially available and known to the trade as a Votator, and is generally described in the United States Patents Nos. 2,063,065 and 2,063,066, issued December 8, 1936. For practical reasons the capacity of the reaction vessel is limited and accordingly the rates of flow of the reactants through the vessel must be adjusted to provide the necessary reaction time.

Salient features of the present invention comprise effective mixing, circulation of the reactants passed confluently through a reaction zone, efficient removal of the heat of reaction therefrom, allowing the mixture to separate into two liquid layers and subsequently sulfonating the aliphatic hydrocarbon layer derived from the mixture from the first reaction zone. The sulfonating mixture and the hydrocarbon feeds are preferably measured and continuously introduced as a gas and a liquid respectively into the reaction vessel.

Before proceeding with specific examples illustrating our invention it may be well to indicate in general the types of compounds that may be sulfonated in the process.

A wide variety of hydrocarbons may be sulfonated to give good yields of sulfonic acids. Such hydrocarbons comprise mixtures of sulfonatable hydrocarbons, namely aromatic hydrocarbons, and unsulfonatable hydrocarbons, namely aliphatic hydrocarbons. Specific hydrocarbons that may be sulfonated by the process of our invention are the co-products to the manufacture of alkaryl hydrocarbons by the alkylation of an excess of benzene, toluene, xylene or similar hydrocarbons with an alkylating agent. The alkylating agent may be a 9 to 20 or more carbon straight or branched chain olefin, alcohol, or halide. Preferred alkylating agents are the 9 to 18 carbon atom polymers of propylene such as tripropylene, tetrapropylene, pentapropylene, and mixtures thereof. When these alkyl aromatics are prepared there is usually more or less co-product formation depending on the conditions of the alkylation. These co-products contain mixtures of alkyl aromatic and aliphatic hydrocarbons. An example of such a co-product is called dodecylbenzene intermediate by the trade. It is obtained as a low boiling co-product to the production of dodecylbenzene by the alkylation of benzene with tetrapropylene. Although this product may vary in aromatic content from 45 to 65%, the product generally available will have an aromatic content of about 57%. Typical physical properties of such a compound are as follows:

Distillation range (° F.):
```
    I.B.P. _____ 358
    5% _____ 372
    10% _____ 375
    50% _____ 395
    90% _____ 445
    95% _____ 460
    F.B.P. _____ 488
    Percent rec_____   99
    A.P.I. gravity at 60° F_____  40.5
    Molecular weight, average_____  193
    Aniline point (° F.)_____   82
    Percent aromatics_____   57
```

Although the sulfonation may be carried out either batch-wise or in a continuous manner, in almost any suitable equipment which will meet the requirements of heat dissipation and thorough admixing of the reactants, we prefer to use a continuous process such as described in the co-pending patent application, Serial No. 396,822, entitled, "Method of Sulfonating Alkyl Aromatic Hydrocarbons," by H. E. Luntz and D. O. Popovac, filed December 8, 1953, now Patent No. 2,768,199 issued October 23, 1956 which disclosure is made a part of this application. In brief, the process described in the co-pending application describes a process for the production of an alkaryl sulfonate utilizing an especially designed Votator comprising a rotatable shaft fitted with scrapers within a jacketed elongated cylinder. In operation the scrapers remove that portion of the reaction mixture present on the inner or heat exchange surfaces of the Votator thus making way for an additional quantity of the mixture to come in contact with the heat exchange surface for cooling. The inlets for the sulfonating agent (sulfur trioxide plus an inert gaseous diluent) are so arranged on the Votator shaft that the sulfonating agent is added to the reaction mixture at a multiplicity of points and just ahead of the scrapers. The addition of the sulfonating agent at a multiplicity of points is very desirable as such a procedure minimizes the presence of excess sulfonating agent at any one point in the reaction vessel thus eliminating localized hot spots. Overheating, as is well known, causes charring of the product. As a further aid to avoid overheating, the mixture consisting of sulfonatable and unsulfonatable hydrocarbons is introduced into one end of the Votator and in passing therethrough, the mixture forms a film on the heat exchange surface of the Votator. When first contacted with the sulfonating agent, this film is only partially sulfonated and is removed in that condition by the progressively moving scrapers. The partially sulfonated material is then reapplied to the heat exchange surface farther along in the Votator as a film and contacted with an additional quantity of the sulfonating agent. Finally, as described above, the partially sulfonated material is removed from the Votator, allowed to separate into two layers, and the upper layer comprising unsulfonatable hydrocarbons having dissolved therein a portion of the sulfonatable hydrocarbons is passed through a second Votator where it is again treated with the sulfonating agent.

When oleum is used as the sulfonating agent, the optimum amount of oleum (21%) to be used is expressed by the following equation:

$$E = 1.50 - 0.0026C \pm 0.05$$

where $E$ = ratio of 21% oleum to the sulfonatable hydrocarbons in the mixture on a weight basis, and
$C$ = mole percent of sulfonatable hydrocarbons in the mixture.

Figure 2:
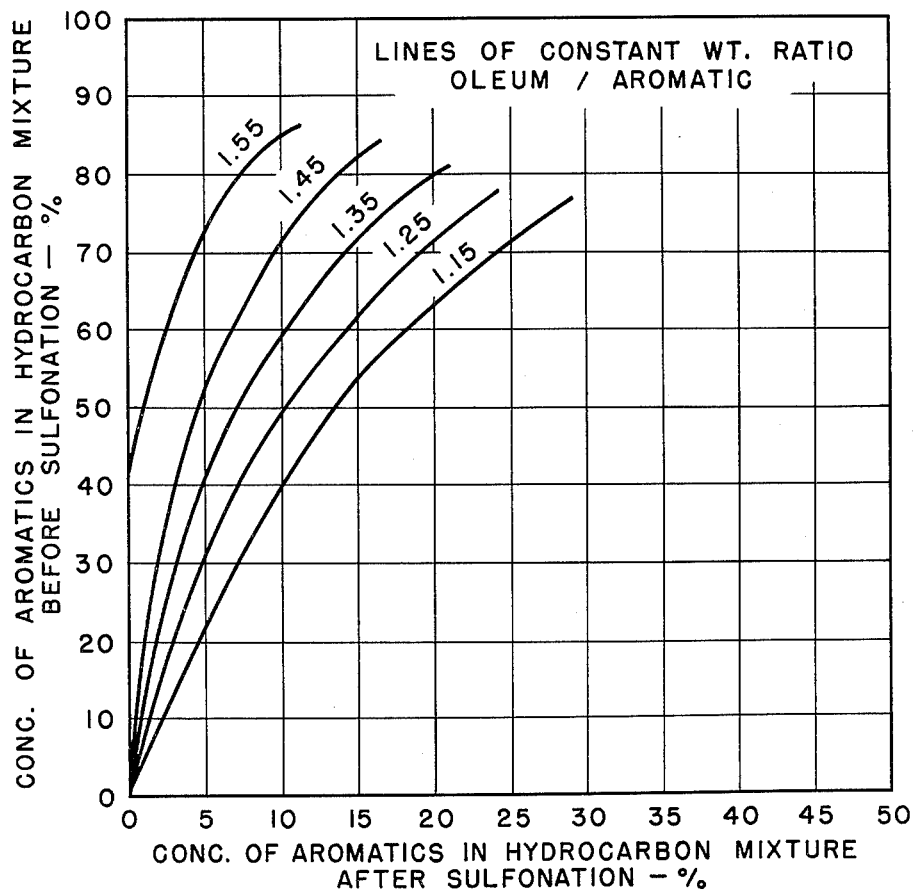

As in the case when sulfur trioxide is used as the sulfonating agent, this equation shows that the higher the concentration of the sulfonatable hydrocarbons in the hydrocarbon mixture being sulfonated, the lower the amount of oleum that should be used to give light colored sulfonates. When the concentration of the sulfonatable hydrocarbons is high, sulfonation will not complete and the unsulfonatable hydrocarbons will be contaminated with unsulfonated sulfonatable hydrocarbons. This is illustrated graphically in FIGURE 2 wherein the relationship of the concentration of sulfonatable hydrocarbons in the hydrocarbon mixture remaining after sulfonation for various amount of oleum is given. The foregoing equation and graph is specific to oleum of 21% strength. It will be obvious, however, to those skilled in the art that similar equations and graphs can be prepared for oleum of strengths different from 21%.

Suitable and preferred temperatures at which the heat exchange surfaces (reaction temperature) are maintained during the sulfonation process using either sulfur trioxide or oleum, range from 30 to 180° F. and 100 to 150° F. respectively. Suitable and preferred amounts of sulfonating agent used in the first sulfonation step should be sufficient to sulfonate from 50 to 97 percent and 85 to 95 percent respectively of the sulfonatable hydrocarbons contained in the mixture. In the final sulfonating step the amount of sulfonating agent used must be sufficient to sulfonate completely the sulfonatable hydrocarbons contained in the mixture. Stated another way, the amount of sulfonating agent used in the first step ranges from 85 to 110 percent, preferably 97 to 107 percent of that which will react stoichiometrically with the sulfonatable hydrocarbons contained in the mixture. Likewise, in the final sulfonation step the amount of sulfonating agent may vary from 105 to 135 percent, preferably 105 to 115 percent of that which will react stoichiometrically with the sulfonatable hydrocarbons in the mixture.

In order to disclose the nature of the present invention still more clearly the following illustrative examples will be given. It is to be understood, however, that the invention is not to be limited to the specific conditions or details set forth in these examples except insofar as such limitations are specified in the appended claims. Parts given are parts by weight.

*Example 1*

One hundred parts of dodecylbenzene intermediate analyzing 57 mole percent of aromatic hydrocarbons was contacted in a first stage with 18 parts (107 percent theory) of sulfur trioxide diluted with 80 parts of air in a modified Votator having 0.7 sq. ft. of heat exchanger surface, two scraper blades, and 9 jets for air-sulfur trioxide before each scraper blade. Exit temperature was about 140° F. The product obtained separated into a hydrocarbon phase of 45 parts analyzing 5.5 percent aromatics and a sulfonic acid phase.

The 45 parts of hydrocarbons analyzing 5.5 percent aromatics was then contacted in a second stage operation with 1.12 parts (115 percent theory) of sulfur trioxide diluted with 7.5 parts of air in equipment used in the first stage. The product obtained separated into a hydrocarbon phase of 43 parts showing no aromatic content on analysis. The sulfonic acid obtained was combined with the sulfonic acid from the first stage and neutralized with aqueous sodium hydroxide. On a dry basis there was obtained 64.5 parts of sodium dodecylbenzene intermediate sulfonate analyzing 93 percent sodium dodecylbenzene intermediate sulfonate and 7 percent sodium sulfate. This product dissolved in water to yield a light wine red colored solution.

*Example 2*

To demonstrate what results are obtained when complete sulfonation is accomplished in one stage, the following operation was performed after a series of runs had been made demonstrating that use of 135 percent of the theoretical amount of sulfur trioxide was required to completely sulfonate the aromatic hydrocarbons in one stage of operation.

Using equipment utilized in Example 1, 100 parts of dodecylbenzene intermediate analyzing 57 mole percent aromatic hydrocarbons was contacted with 23.8 parts (135 percent theory) of sulfur trioxide diluted with 110 parts of air. The resulting hydrocarbon layer was free of aromatics. On neutralizing the sulfonic acid so obtained with aqueous sodium hydroxide and drying, 68.2 parts of sodium dodecylbenzene sulfonate analyzing 12 percent sodium sulfate was obtained. This product dissolved in water to yield a dark wine red colored solution.

*Example 3*

One hundred parts of dodecylbenzene intermediate analyzing 57 mole percent of aromatic hydrocarbons was contacted with 18.5 parts (110 percent theory) of sulfur trioxide diluted with 80 parts of air batch-wise in jacketed kettle. Reaction temperature was about 140° F. The product obtained separated into a hydrocarbon phase of 45 parts analyzing 5.6 percent aromatics and a sulfonic acid phase.

The 45 parts of hydrocarbons analyzing 5.6 percent aromatics was then contacted with 1.15 parts (118 percent theory) of sulfur trioxide diluted with 7.5 parts of air. The product obtained separated into a hydrocarbon phase of 43 parts showing no aromatic content on analysis. Slightly more sulfur trioxide was necessary in batch sulfonation than in continuous. The sulfonic acid was combined with the sulfonic acid from the first stage and neutralized with aqueous sodium hydroxide. On a dry basis there was obtained 64.5 parts of sodium dodecylbenzene intermediate sulfonate analyzing 92.5 percent sodium dodecylbenzene intermediate and 7.5 percent sodium sulfate.

*Example 4*

To demonstrate what results are obtained when complete sulfonation is accomplished in one stage, batchwise, the following operation was performed after a series of runs had been made demonstrating that use of 140% of the theoretical amount of sulfur trioxide was required to completely sulfonate the aromatic hydrocarbon in one stage of batch operation.

One hundred parts of dodecylbenzene intermediate analyzing 57 mole percent of aromatic hydrocarbon was contacted with 24.7 parts (140 percent theory) of sulfur trioxide diluted with 114 parts of air. The resulting hydrocarbon layer was free of aromatics. On neutralizing the sulfonic acid with aqueous sodium hydroxide and drying, 68.5 parts of sodium dodecylbenzene sulfonate analyzing 13 percent sodium sulfate was obtained.

*Example 5*

To demonstrate what results are obtained when the sulfonation agent is oleum, the following operation was performed showing the same trend as with sulfur trioxide.

One hundred parts of dodecylbenzene intermediate, analyzing 57 mole percent of aromatic hydrocarbons, was contacted in a first stage with 77 parts of oleum (21% free SO₃), batchwise in the reactor used in Example 3. Reaction temperature was about 130° F. The product obtained separated into a hydrocarbon phase of 47 parts analyzing 9.1 percent aromatics and a sulfonic-sulfuric acid phase.

The 47 parts of hydrocarbons analyzing 9.1 percent aromatics was then contacted in a second stage operation with 6.4 parts of oleum (21% free SO₃). The product obtained separated into a hydrocarbon phase of 43 parts showing no aromatic content on analysis. The sulfonic-sulfuric acid obtained was combined with the sulfonic-sulfuric acid from the first stage and separated by dilution with water and settling. The sulfonic acid was neutralized with aqueous sodium hydroxide. On a dry basis there was obtained 72.5 parts of sodium dodecylbenzene intermediate sulfonate analyzing 19 percent sodium sulfate.

*Example 6*

To demonstrate what results are obtained when complete sulfonation is accomplished in one stage with oleum, the following operation was performed after a series of runs had been made demonstrating that use of 1.6 parts of oleum (21% free SO₃) per part of aromatic was required to completely sulfonate the aromatic hydrocarbons at an operating temperature of about 130° F.

One hundred parts of dodecylbenzene intermediate analyzing 57 mole percent aromatic hydrocarbons was contacted with 91 parts of oleum (21% free SO₃). The resulting hydrocarbon layer was free of aromatics. On neutralizing the separated sulfonic acid with aqueous sodium hydroxide and drying, 78 parts of sodium dodecylbenzene sulfonate analyzing 28 percent sodium sulfate was obtained.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A process for the complete sulfonation of the alkyl substituted benzenes contained in a mixture of said benzenes and branched-chain acyclic aliphatic hydrocarbon impurities not removable by conventional distillation which comprises introducing into said mixture an amount of sulfonating agent sufficient to sulfonate from 50 to 97 percent of the alkyl substituted benzenes present in said mixture, allowing said mixture to separate into two layers, a lower layer comprising sulfonated alkyl substituted benzenes and an upper layer comprising the branched-chain acyclic aliphatic hydrocarbons diluted with unsulfonated alkyl substituted benzenes, separating said layers, introducing into said recovered upper layer an additional amount of said sulfonating agent sufficient to sulfonate completely the alkyl substituted benzenes contained therein, and separating the sulfonated alkyl substituted benzenes from the branched-chain acyclic aliphatic hydrocarbons.

2. The process of claim 1 wherein the sulfonating agent is sulfur trioxide diluted with an inert gas.

3. The process of claim 1 wherein the sulfonating agent is sulfur trioxide diluted with air.

4. The process of claim 1 wherein the sulfonating agent is oleum.

5. A process for the complete sulfonation of the alkyl substituted benzenes contained in a mixture of said benzenes and branched-chain acyclic aliphatic hydrocarbon impurities not removable by conventional distillation which comprises introducing into said mixture an amount of sulfonating agent sufficient to sulfonate from 85 to 95 percent of the alkyl substituted benzenes present in said mixture, allowing said mixture to separate into two layers, a lower layer comprising sulfonated alkyl substituted benzenes and an upper layer comprising the branched-chain acyclic aliphatic hydrocarbons diluted with unsulfonated alkyl substituted benzenes, separating said layers, introducing into said recovered upper layer an additional amount of said sulfonating agent sufficient to sulfonate completely the alkyl substituted benzenes contained therein, and separating the sulfonated alkyl substituted benzenes from the branched-chain acyclic aliphatic hydrocarbons.

6. A process for the complete sulfonation of the alkyl substituted benzenes contained in a mixture of said benzenes and branched-chain acyclic aliphatic hydrocarbon impurities not removable by conventional distillation which comprises applying said mixture as a film to a heat exchange surface which is maintained within the range of 30 to 180° F., introducing a sulfonating agent into said film wherein the amount of said sulfonating agent thus introduced is sufficient to sulfonate from 50 to 97 percent of the alkyl substituted benzenes present in said film at a point closely in advance of a progressively moving scraper, thus partially sulfonating the alkyl substituted benzenes contained in said film, allowing the reaction mixture to separate into two layers, the lower layer comprising sulfonated alkyl substituted benzenes and the upper layer comprising the branched-chain acyclic aliphatic hydrocarbons diluted with unsulfonated alkyl substituted benzenes, separating said layers, reapplying said upper layer to a second heat exchange surface which is maintained within the range of 30 to 180° F., introducing an additional quantity of said sulfonating agent into said reapplied film, wherein the amount of sulfonating agent thus introduced into said reapplied film is sufficient to sulfonate completely the alkyl substituted benzenes contained therein at a point closely in advance of a progressively moving scraper, and separating the sulfonated alkyl substituted benzenes from the branched-chain acyclic aliphatic hydrocarbons.

7. The process of claim 6 wherein the sulfonating agent is sulfur trioxide diluted with an inert gas.

8. The process of claim 6 wherein the sulfonating agent is sulfur trioxide diluted with air.

9. A process for the complete sulfonation of the alkyl substituted benzenes contained in a mixture of said benzenes and branched-chain acyclic aliphatic hydrocarbon impurities which comprises applying said mixture as a film to a heat exchange surface which is maintained within the range of 30 to 180° F., introducing a sulfonating agent into said film wherein the amount of said sulfonating agent thus introduced is sufficient to sulfonate from 85 to 95 percent of the alkyl substituted benzenes present in said film at a point closely in advance of a progressively moving scraper, thus partially sulfonating the alkyl substituted benzenes contained in said film, allowing the reaction mixture to separate into two layers, the lower layer comprising sulfonated alkyl substituted benzenes and the upper layer comprising the branched-chain acyclic aliphatic hydrocarbons diluted with unsulfonated alkyl substituted benzenes, separating said layers, reapplying said upper layer to a second heat exchange surface which is maintained within the range of 30 to 180° F., introducing an additional quantity of said sulfonating agent into said reapplied film, wherein the amount of sulfonating agent thus introduced into said reapplied film is sufficient to sulfonate completely the alkyl substituted benzenes contained therein at a point closely in advance of a progressively moving scraper, and separating the sulfonated alkyl substituted benzenes from the branched-chain acyclic aliphatic hydrocarbons.

10. A process for the complete sulfonation of the alkyl substituted benzenes contained in a product having an average molecular weight of about 193 and an aromatic content of 45–65 percent which comprises introducing into said product an amount of sulfonating agent sufficient to sulfonate from 85 to 95 percent of the alkyl substituted benzenes present in said product, allowing the reaction mixture to separate into two layers, a lower layer comprising unsulfonated alkyl substituted benzenes and an upper layer comprising branched-chain acyclic aliphatic hydrocarbons diluted with unsulfonated alkyl substituted benzenes, separating said layers, introducing into said recovered upper layer an additional amount of said sulfonating agent sufficient to sulfonate completely the alkyl substituted benzenes contained therein and separating the sulfonated alkyl substituted benzenes from the branched-chain acyclic aliphatic hydrocarbons.

11. A process for the complete sulfonation of the alkyl substituted benzenes contained in a product having an average molecular weight of about 193 and an aromatic content of 45–65 percent which comprises applying said product as a film to a heat exchange surface which is maintained within the range of 30 to 180° F., introducing a sulfonating agent into said film wherein the amount of said sulfonating agent thus introduced is sufficient to sulfonate from 85 to 95 percent of the alkyl substituted benzenes present in said film at a point closely in advance of a progressively moving scraper, thus partially sulfonating the alkyl substituted benzenes contained in said film, allowing the reaction mixture to separate into two layers, a lower layer comprising sulfonated alkyl substituted benzenes and an upper layer comprising branched-chain acyclic aliphatic hydrocarbons diluted with unsulfonated alkyl substituted benzenes, separating said layers, reapplying said upper layer to a second heat exchange surface which is maintained within the range of 30 to 180° F., introducing an additional quantity of said sulfonating agent into said reapplied film, wherein the amount of sulfonating agent thus introduced into said reapplied film is sufficient to sulfonate completely the alkyl substituted benzenes contained therein at a point closely in advance of a progressively moving scraper, and separating the sulfonated alkyl, substituted benzenes from the branched-chain acyclic aliphatic hydrocarbons.

12. The process of claim 11 wherein the sulfonating agent is sulfur trioxide diluted with an inert gas.

13. The process of claim 11 wherein the sulfonating agent is sulfur trioxide diluted with air.

References Cited in the file of this patent
UNITED STATES PATENTS

| | | |
|---|---|---|
| 2,524,086 | Schmerling | Oct. 3, 1950 |
| 2,567,854 | Nixon | Sept. 11, 1951 |
| 2,630,302 | Jones | Mar. 3, 1953 |
| 2,723,990 | Gilbert et al. | Nov. 15, 1955 |
| 2,768,199 | Luntz et al. | Oct. 23, 1956 |